United States Patent [19]

Gazzola

[11] 4,246,827

[45] Jan. 27, 1981

[54] DEVICE FOR TEACHING MUSIC

[76] Inventor: Giovanni Gazzola, No. 6A, Via di Villa Sacchetti, Rome, Italy

[21] Appl. No.: 8,024

[22] Filed: Jan. 31, 1979

[30] Foreign Application Priority Data

Feb. 10, 1978 [IT] Italy ............................ 48016 A/78
Sep. 29, 1978 [IT] Italy ............................ 51313 A/78

[51] Int. Cl.³ .................................................. G09B 15/04
[52] U.S. Cl. ......................... 84/470 R; 84/1.01; 84/471 R; 84/483 R; 434/340
[58] Field of Search ............... 89/470 R, 471 R; 35/9 B, 9 C, 9 D; 84/1.01, 483

[56] References Cited

U.S. PATENT DOCUMENTS

| 2,888,849 | 6/1959 | Humphrey | 84/470 |
| 3,084,589 | 4/1963 | Amato | 84/470 |
| 3,186,291 | 6/1965 | Pedicano | 84/470 |
| 3,562,394 | 2/1971 | Kiepe | 84/470 |
| 4,069,597 | 1/1978 | Bigorre | 35/9 C |

Primary Examiner—L. T. Hix
Assistant Examiner—S. D. Schreyer
Attorney, Agent, or Firm—Pollock, Vande Sande & Priddy

[57] ABSTRACT

A device for teaching music comprising, in combination, a set of pegs or keys subdivided into seven groups corresponding to the seven musical notes, a set of cards obtained by a sheet material, each card containing a musical passage consisting of coded holes corresponding to the notes of the passage, and means for reproducing the sounds corresponding to each of the seven notes when the respective pegs selectively associated with each hole are first introduced into said holes, and then sequentially depressed.

15 Claims, 15 Drawing Figures

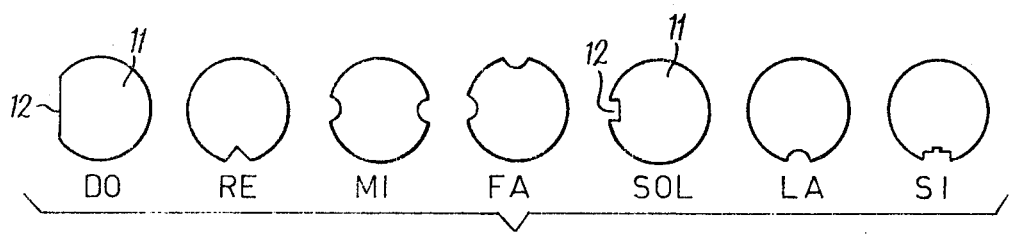
FIG. 9
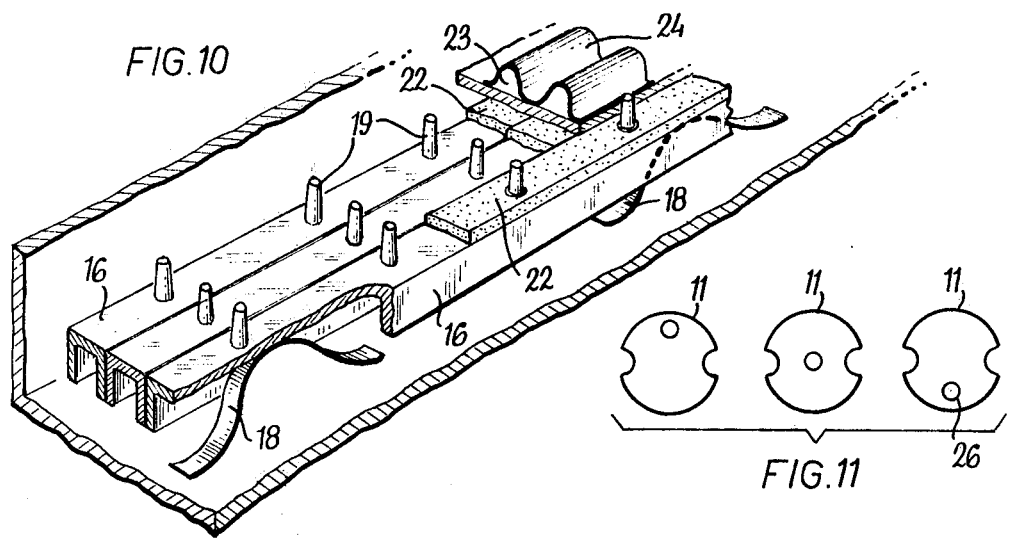
FIG. 10
FIG. 11
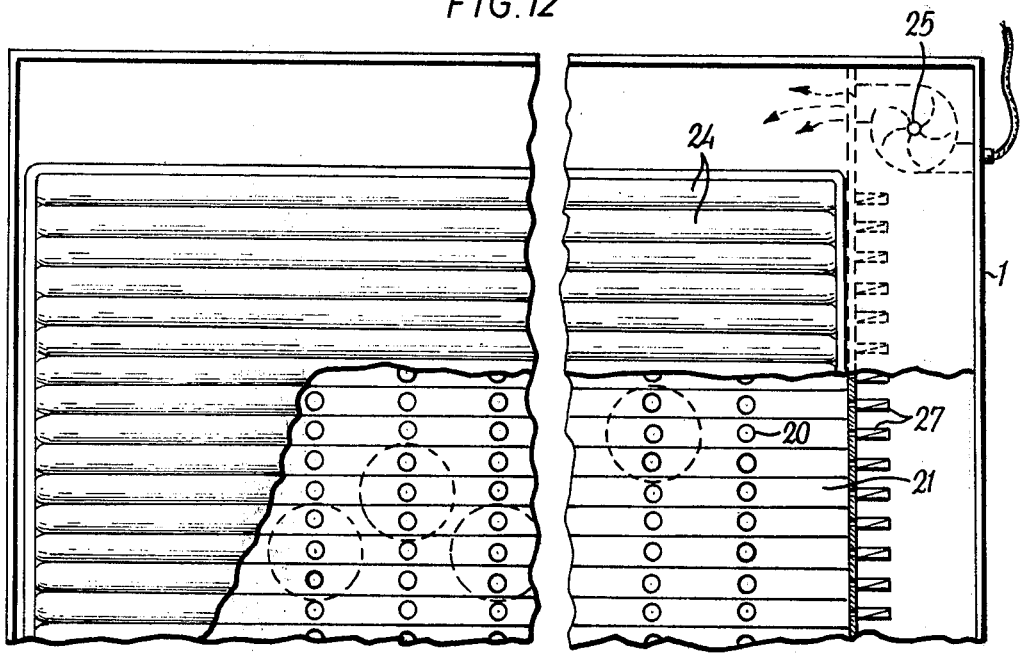
FIG. 12

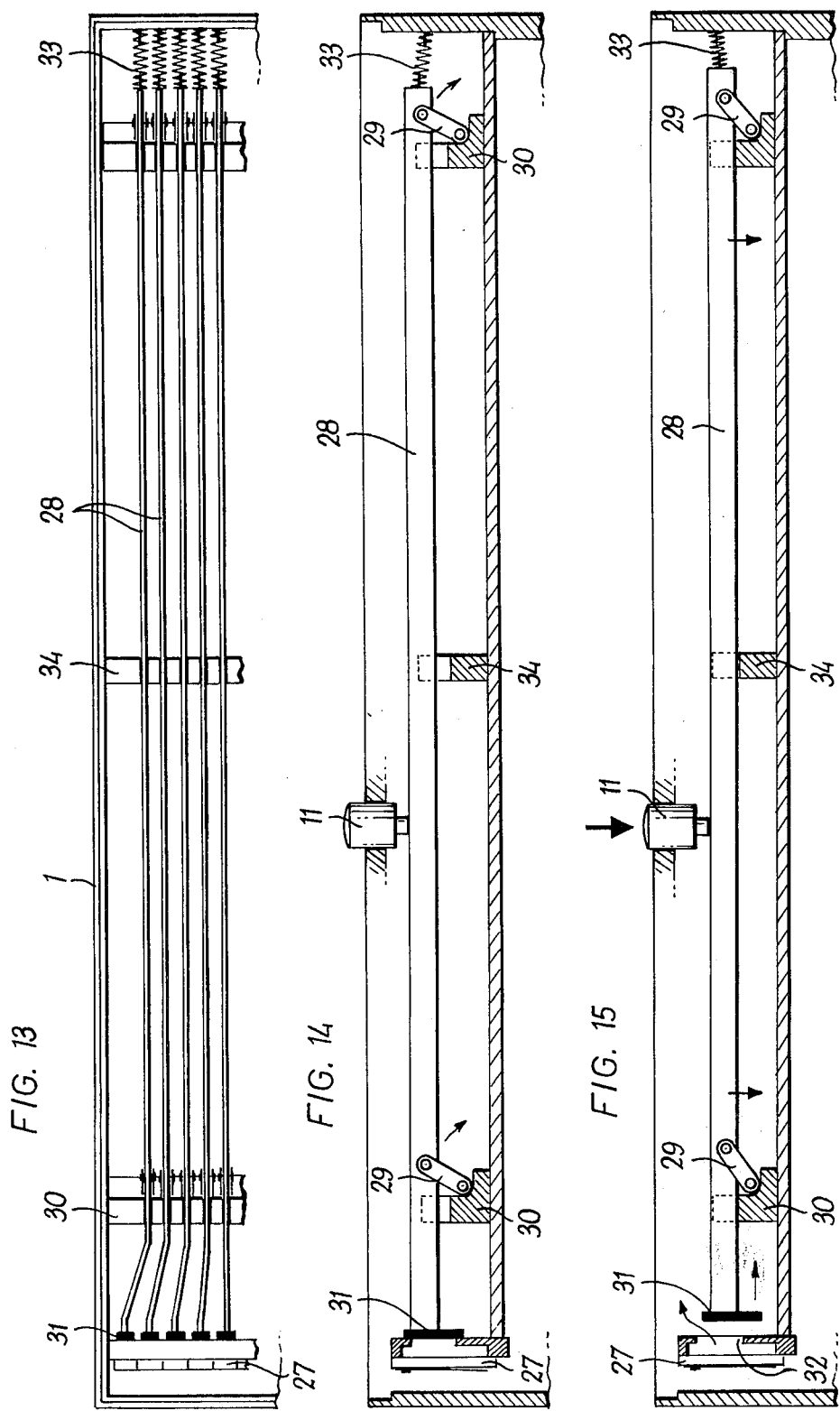

DEVICE FOR TEACHING MUSIC

SUMMARY OF THE INVENTION

The present invention relates to a device for teaching music.

The purpose of the invention is that of embodying a teaching device which also serves as a toy and/or a musical instrument. More particularly, the invention is intended to convey to even very small children the rudiments of musical notation, such as the position and duration of the notes on the pentagram, and furthermore to obtain immediately therefrom a sound, without intervention of a musical instrument.

According to this invention, a device is provided comprising, in combination, a set of pegs or keys subdivided into seven groups corresponding to the seven musical notes, a set of cards obtained by a sheet material each provided with a musical passage consisting of coded holes corresponding to the musical notes of the passage, and means for reproducing the sounds corresponding to each of said notes when the respective pegs, selectively associated to each hole are first introduced thereinto, and then sequentially pressed.

The coding of the holes through the cards, and of the pegs destined to be introduced into said holes, is such that it is possible to introduce into each hole only the respective appropriate peg. The "sharp" and "flat" alterations of each note are distinguished, in the holes of the cards and in the pegs, according to different colours or other indicia.

BRIEF INTRODUCTION TO THE DRAWINGS

The invention will now be described with reference to the attached drawings, wherein a preferred embodiment is shown by way of example, and wherein:

FIG. 9 shows the coding of the peg keys corresponding to the seven notes;

FIG. 10 is a partially sectional perspective view of the unit of FIG. 8;

FIG. 11 shows the lower part of the pegs for operating the unit of FIG. 8;

FIG. 12 is a partially sectional plan view of the unit of FIG. 8;

FIG. 13 is a plan view of a further embodiment of the sound reproduction unit;

FIG. 14 is a sectional view of the device of FIG. 13, showing a peg in its rest position; and FIG. 15 is a view similar to FIG. 14 showing the operation position.

DESCRIPTION OF A PREFERRED EMBODIMENT

Figure 1:
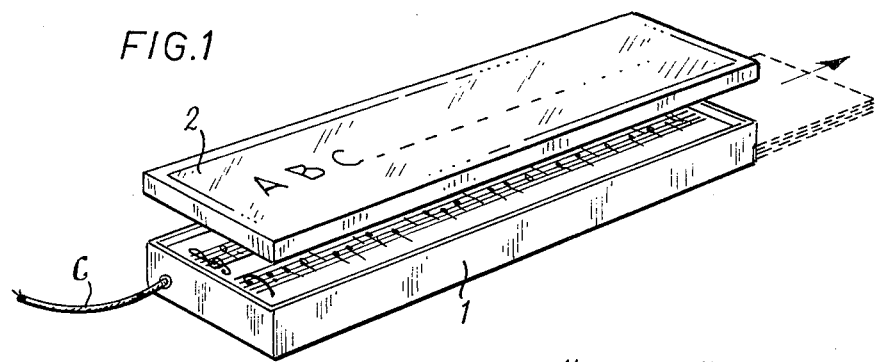
FIG. 1 is a perspective view of the device with its cover raised.
Figure 2:
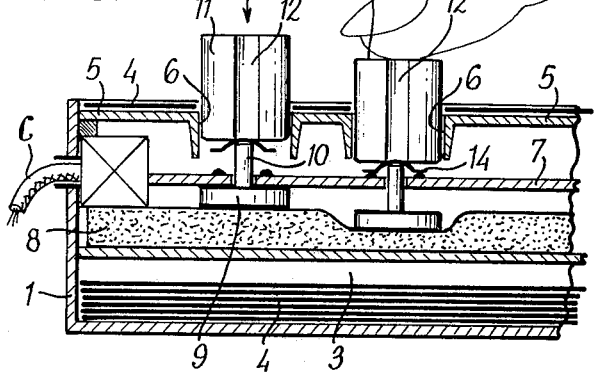
FIG. 2 is a partial sectional view of the device of FIG. 1, in an enlarged scale.

With reference to FIGS. 1 and 2, reference numeral 1 denotes the casing, in the shape of a parallelopiped box or other suitable form, preferably provided with a cover 2. The base of the box 1 is provided with a recess 3 for storing a certain number of cards 4 which will be described in greater detail hereinafter.

In the upper part of the box 1 is located a rigid plate 5 provided with a plurality of holes 6 distributed throughout the entire surface thereof. Under the plate 5, a second plate 7 is located, carrying a printed circuit, as partially shown in FIG. 5. The printed circuit is associated with a set of sound generators G, and to a group of components denoted I to IV which will not be described in detail as they are known.

This unit includes the oscillators, I, the amplifiers II, the loudspeakers III, and the transformer-rectifier IV.

Under the plate 7 a layer of resilient material 8 is arranged and on said layer rest the dishes 9 carried by the stems 10 which pass through said plate 7 in a position centered with respect to the above holes 6.

Figure 3:
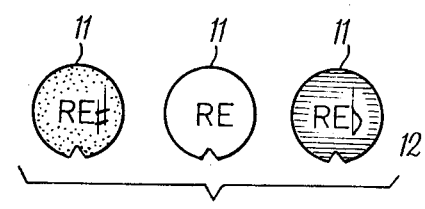
FIG. 3 shows a peg key for the note "re" (D) in its three variants, respectively "sharp", natural and "flat"
Figure 4:
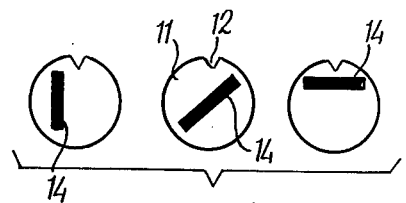
FIG. 4 shows the contact bridges placed at the base of the pegs of FIG. 3.
Figure 6:
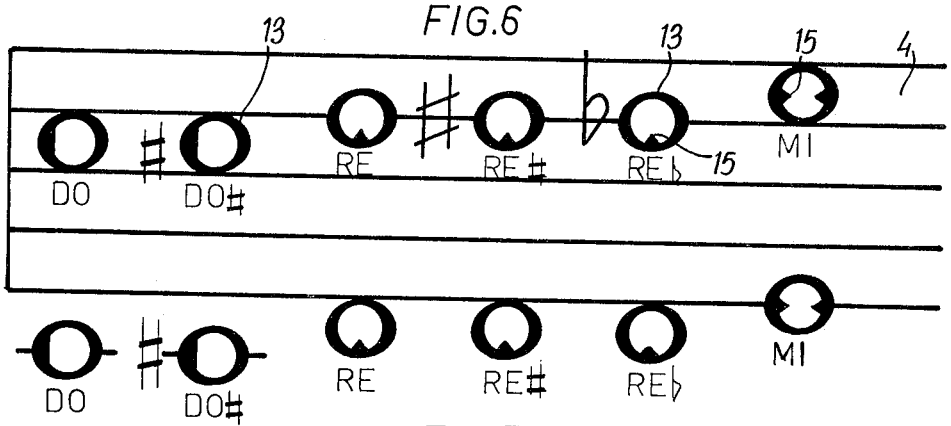
FIG. 6 shows the detail of a card with the indication of the pentagram and of the coded holes corresponding to a passage.
Figure 7:
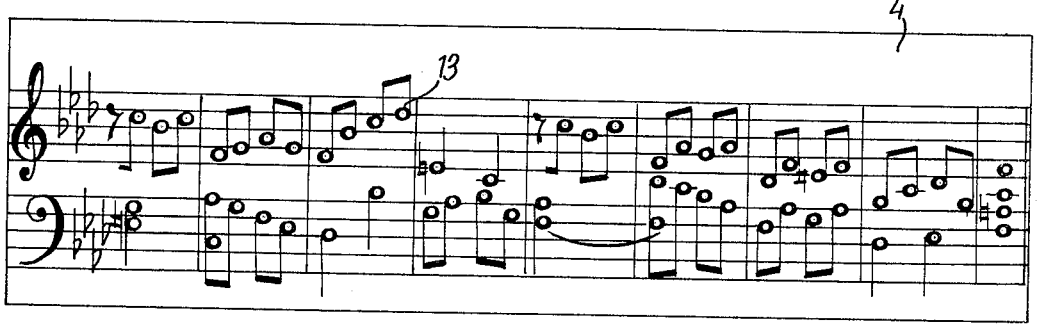
FIG. 7 is a general view of a card.

An integrating part of the device consists of the pegs 11, subdivided into seven groups, corresponding to the seven notes. As shown in FIG. 3, the "sharp" and "flat" alterations of each note are indicated by different colors with respect to the natural note. Each peg 11, or, more precisely, each note (see also FIG. 9) is coded by one or more notches 12 so that the pegs can be inserted only in the appropriate positions. Said pegs are used in relation to a set of cards 4 containing various musical passages having different degress of difficulty. One of the cards 4 is shown in FIGS. 6 and 7.

Figure 5:
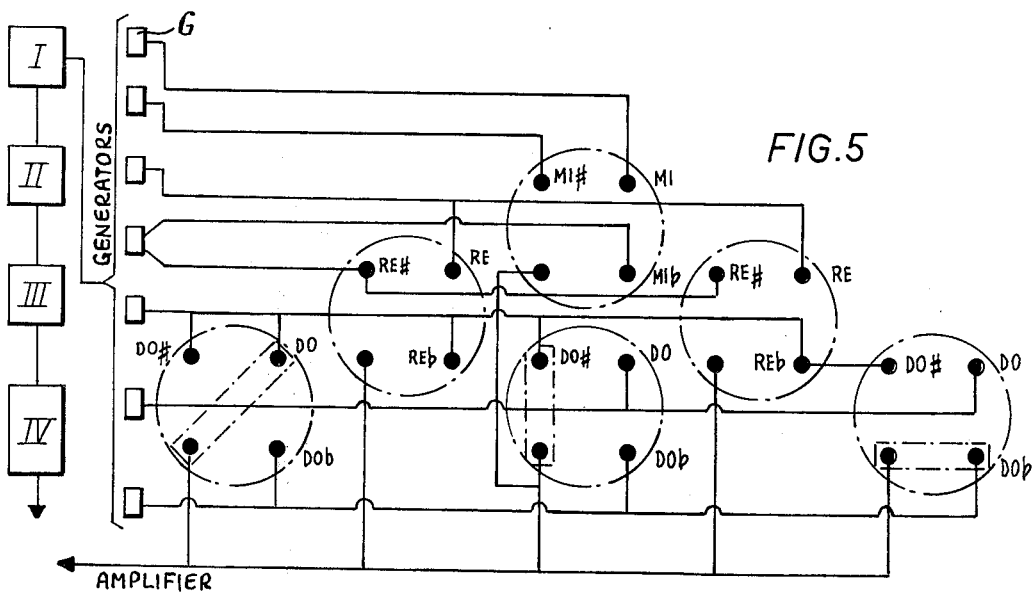
FIG. 5 shows the electronic diagram of the unit for reproducing the sounds.

One hole 13 coded like the above described holes is associated with each note of the two pentagrams. Of course, the holes 13 of the cards are provided with teeth 15 corresponding to the notches 12 of the pegs. In the base part of the pegs 11 are arranged contact bridges 14 intended to close determined circuits in the sound reproduction unit as shown in FIG. 5.

The use of the device is very simple and immediate; when the box 1 has been connected by the cable C to the external sound generator, one of the cards 4 is selected and placed on the upper plate 5. Some of the holes of the plate 5 will of course be covered by the card, while other holes will correspond with the notes appearing on the card itself.

At this point, it will be necessary to search the various pegs 11 corresponding to the various notes and insert the pegs into the relative holes, as shown in FIG. 2.

When the pegs 11 have been inserted, they will be depressed in order, and the sounds corresponding to the musical passage on the card will be produced. In order to produce each sound, it is necessary to depress the peg 11 until the bridge 14 makes contact with the printed circuit. The duration of the sound is determined by the time of operation of the peg. As soon as the pressure is released, the elastic layer 8 pushes the peg 11 upwards, and the bridge 14 will move upwards, thus interrupting the contact.

Figure 8:
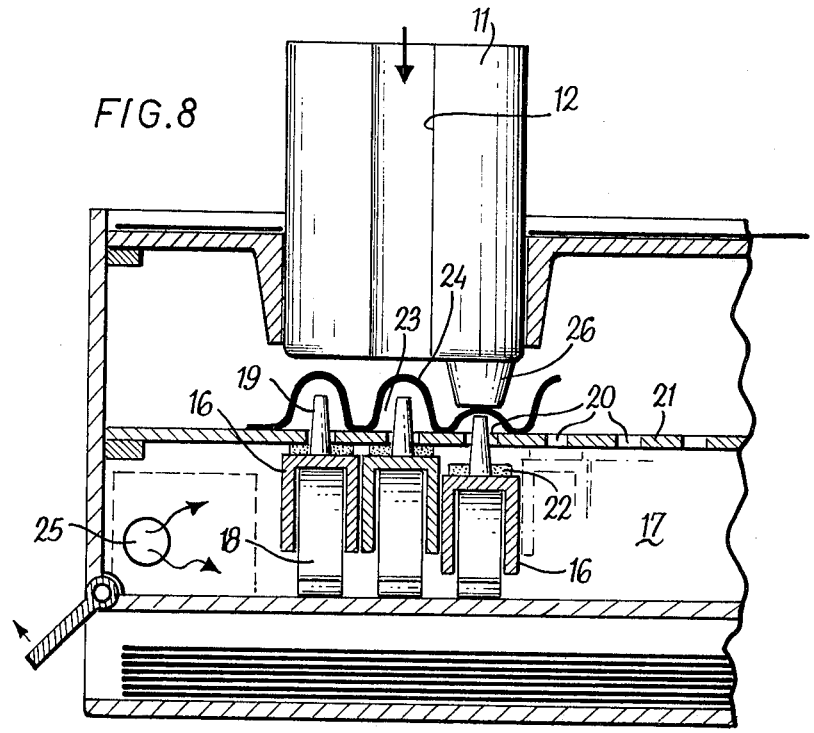
FIG. 8 is a sectional view similar to FIG. 2 showing a second embodiment of the sound reproduction unit.

FIGS. 8, 10 and 12 show a different embodiment of the sound reproduction unit. In this case, instead of the printed circuit, a set of channel members 16 is contained within the recess 17 and pushed upwards by the leaf springs 18. The channel members 16 are provided with a set of conical pins 19 inserted into the holes 20 of the plane 21 and a packing 22 is interposed between each member and said apertured plane 21. Above said plane 21 a series of ducts 23 is arranged, obtained by a corrugated elastic sheet 24. Into the recess 17 air is conveyed by a blower 25 (FIG. 12).

As shown in FIGS. 8 and 11, the pegs 11 of this embodiment, instead of the contact bridge, are provided with a projection 26 which occupies three different positions in each note (FIG. 11) according to the natural note, or its "sharp" or "flat" variants. Each duct 23 is associated with an element 27 capable of emitting one sound.

The operation is quite similar to that already described: the pegs 11 are selected according to the musical note denoted on the card, and are then depressed. The projection 26 (FIG. 8) acts on the conical pin 19, causing downward movement of the channel member 16 against the action of the spring 18. The hole 20 is freed and the compressed air passes through the duct 23, operating the sound producing element associated with the note.

FIGS. 13 to 15 show yet another embodiment of the device according to the invention. In this case, each sound generating element 27 is associated with a horizontal rod 28 mounted on the parallelogram links 29 pivoted on the supports 30.

Each rod 28 is provided at one of its ends with a packing 31 which sealingly closes the outlet hole 32 of each sound producing element 27 under the action of the spring 33. At the center of each rod is located a stop abutment 34.

The operation is as follows: When the peg 11 (FIG. 15) is depressed, the rod 28 moves downwards until it contacts the stop abutment 34, and simultaneously the rod slides against the action of the spring 33, freeing the hole 32 of the sound producing element 27 which will thus be operated until the peg 11 is depressed. When the peg 11 is released, the spring 33 returns the rod 28 to its closure position. The peg 11 of course will be selected and used as already described.

From the foregoing description, it will be evident that the device according to the invention facilitates the learning of musical notations in a gradual and simple manner. Moreover, the device may also be used creatively, both because it can serve as a musical instrument (by locating the peg-keys according to the chromatic scale) and, because by locating the keys in correspondence with the notes of an invented melody, it will be possible to play said melody, to note it, and to recompose it as desired. Thus the invention facilitates not only reading but also writing of music.

Having thus described the present invention, what is claimed is:

1. A device for teaching music, comprising, in combination,
    (a) a set of pegs subdivided in seven groups corresponding to the seven musical notes;
    (b) a card containing a musical passage consisting of coded holes corresponding to the notes of said passage; and
    (c) means for reproducing the sounds corresponding to each of the seven notes when the respective pegs selectively associated with each hole are first introduced into said holes and then sequentially depressed.

2. A device as claimed in claim 1, wherein the coding of the holes carried by the card and of the associated pegs is such that each hole will accept only the peg representing the appropriate note.

3. A device as claimed in claim 1 or 2, wherein said code consists of at least one notch or projection carried by each peg, to which correspond equal projections or notches in the holes of the card.

4. A device as claimed in claim 1, wherein the "sharp" and "flat" variants of each note are differentiated with respect to the natural tonality by a different color of the peg, and of the circle surrounding the hole through the card.

5. A device as claimed in claim 1, wherein said sound reproduction means comprises a printed circuit associated with a sound generating system, operated by contact carrying bridging members located at the bases of said pegs.

6. A device as claimed in claim 5, wherein the various contacts of said printed circuit are located under an apertured plate whereon is located said card so as to leave available only the holes corresponding to those of the card.

7. A device as claimed in claim 5, wherein each sound is generated due to the pressure of the corresponding peg against the action of a resilient means which interrupts the contact of said bridging member as soon as the peg is released.

8. A device as claimed in claim 1, wherein said sound reproduction means comprises a set of compressed air ducts associated with a corresponding set of sound generating elements, and selectively operated by a projecting element located at the base of each peg.

9. A device as claimed in claim 8, wherein said projecting element is located in a different position dependent on whether the note is natural, "sharp" or "flat."

10. A device as claimed in claim 8, wherein said valve comprises a conical pin, inserted into a communication hole, and pushed to the closure position by spring means acting on a longitudinal member U-shaped in cross section, associated with each blow pipe, and located under said member.

11. A device according to claim 1, wherein said air ducts are defined by a set of parallel blow pipes, obtained by a corrugated sheet of resilient material, and the compressed air inflow is controlled by a projecting element which opens a valve causing the compressed air to communicate with said blow pipe.

12. A device as claimed in claim 1, wherein said sound reproduction means comprises a set of horizontal rods, associated with each sound reproduction element, slidable under the control of each peg against the action of a spring means biasing the rod to a position closing the outlet hole for the air from said sound generating element.

13. A device as claimed in claim 12, wherein said rods are connected to the casing by pairs of short links, slightly inclined with respect to the vertical, whereby the pressure on said peg is converted to horizontal sliding movement of the rod.

14. A device as claimed in claim 12, wherein a said spring means is mounted on one end of each rod, the other end of each rod being provided with a packing for abutment against said air passage for the sound generating element.

15. A device for teaching music, comprising in combination,
    (a) a set of pegs subdivided in seven groups corresponding to the seven musical notes;

a card containing a musical passage consisting of coded holes corresponding to the notes of said passage; and (c) means for reproducing the sounds corresponding to each of the seven notes when the respective pegs selectively associated with each hole are first introduced into said holes and then sequentially depressed;

(d) said code consisting of at least one notch or projection carried by each peg, to which correspond equal projections or notches in the holes of the card, whereby each hole will accept only the peg representing the appropriate note.

* * * * *